United States Patent
Parab et al.

(10) Patent No.: US 11,865,976 B2
(45) Date of Patent: Jan. 9, 2024

(54) MOUNT FOR A HANDHELD ELECTRONIC DEVICE

(71) Applicant: ANNEX PRODUCTS PTY, LTD., South Yarra (AU)

(72) Inventors: Nish Parab, Kew (AU); Martin K. Loscher, Bentleigh East (AU)

(73) Assignee: ANNEX PRODUCTS PTY LTD, South Yarra (AU)

( * ) Notice: Subject to any disclaimer, the term of this patent is extended or adjusted under 35 U.S.C. 154(b) by 6 days.

(21) Appl. No.: 17/404,391

(22) Filed: Aug. 17, 2021

(65) Prior Publication Data

US 2023/0059408 A1    Feb. 23, 2023

(51) Int. Cl.
    B62J 11/00    (2020.01)
    B60R 11/02    (2006.01)
    F16C 11/10    (2006.01)
    B60R 11/00    (2006.01)

(52) U.S. Cl.
    CPC ....... *B60R 11/02* (2013.01); *B60R 2011/0089* (2013.01); *F16C 11/106* (2013.01)

(58) Field of Classification Search
    CPC ......... B60R 11/0241; B60R 2011/0089; F16C 11/106; F16M 11/2078; F16M 11/041; F16M 11/14; F16M 13/022; F16M 2200/022; B62J 50/225
    See application file for complete search history.

(56) References Cited

U.S. PATENT DOCUMENTS

| | | | |
|---|---|---|---|
| 5,845,885 A | 12/1998 | Carnevali | |
| 6,478,276 B1 | 11/2002 | Louh | |
| 6,513,774 B2 | 2/2003 | Hailson | |
| 6,561,476 B2 | 5/2003 | Carnevali | |
| 6,581,892 B2 | 6/2003 | Carnevali | |
| 6,585,201 B1 | 7/2003 | Reed | |
| 7,025,315 B2 | 4/2006 | Carnevali | |

(Continued)

FOREIGN PATENT DOCUMENTS

| DE | 202017106354 U1 | 10/2017 |
|---|---|---|
| GB | 2452046 | 2/2009 |

OTHER PUBLICATIONS

Arkon, "TABRMAMPS-MET, Arkon Drill-Base Tablet Mount," retrieved from the Internet at: https://arkon.com.au/tabrmamps-met-arkon-drill-base-tablet-mount-for-apple-ipad-air-2-ipad-pro-ipad-4-3-2-samsung-galaxy-tablets.html?sqr=heavy-duty%20drill%20base%20mount&, (publicly available at least by Aug. 17, 2021).

(Continued)

*Primary Examiner* — Terrell L McKinnon
*Assistant Examiner* — Jerry Olivier
(74) *Attorney, Agent, or Firm* — Barnes & Thornburg LLP

(57) ABSTRACT

A mount for mounting a case of a handheld electronic device to a vehicle includes an arm comprising a pair of arm members, first and second coupling member engaged with the arm for adjustably coupling the device to the vehicle, a spring and a fastener for adjustably securing the two arms together. The fastener is rotatable between a first position in which the arm members are rigidly secured together and the first and second coupling members are rigidly secured to the arm and a second position for adjusting the first coupling member and the second coupling member relative to the arm. The spring biases the arm members towards each other when the fastener is in the second position.

25 Claims, 7 Drawing Sheets

(56) References Cited

U.S. PATENT DOCUMENTS

| | | |
|---|---|---|
| 7,090,181 B2 | 8/2006 | Biba et al. |
| 7,178,421 B2 | 2/2007 | Filipiak et al. |
| 7,422,184 B2 | 9/2008 | Carnevali |
| 7,531,732 B2 | 5/2009 | Dunlop |
| 7,665,697 B1 | 2/2010 | O'Connor |
| 7,723,595 B2 | 5/2010 | Dunlop |
| 8,037,904 B2 | 10/2011 | Carnevali |
| D649,535 S | 11/2011 | Lau |
| 8,177,178 B2 | 5/2012 | Carnevali |
| 8,201,800 B2 | 6/2012 | Filipiak |
| 8,235,265 B2 | 8/2012 | Barnes |
| 8,366,064 B2 | 2/2013 | Chen et al. |
| 8,454,178 B2 | 6/2013 | Carnevali |
| 8,487,169 B2 | 7/2013 | Dunlop |
| 8,590,855 B2 | 11/2013 | Carnevali |
| 8,608,120 B2 | 12/2013 | Chen et al. |
| 9,180,925 B2 | 11/2015 | Carnevali |
| 9,188,280 B2 | 11/2015 | Congdon |
| 9,568,145 B2 | 2/2017 | Carnevali |
| 9,568,148 B2 | 2/2017 | Carnevali |
| 9,615,636 B2 | 4/2017 | Harrison et al. |
| D803,674 S | 11/2017 | Carnevali |
| 9,933,109 B2 | 4/2018 | Moore |
| D818,421 S | 5/2018 | Hu |
| 9,958,759 B2 | 5/2018 | Johnson et al. |
| 10,112,669 B1 | 10/2018 | McGeever et al. |
| 10,155,306 B1 | 12/2018 | Carnevali |
| D845,963 S | 4/2019 | Lindo |
| D846,543 S | 4/2019 | Chen |
| D847,823 S | 5/2019 | Monsalve |
| D873,812 S | 1/2020 | Peters |
| 10,787,239 B2 | 9/2020 | Corley |
| D934,231 S | 10/2021 | Liao |
| 2005/0095058 A1 | 5/2005 | Biba et al. |
| 2005/0269465 A1 | 12/2005 | Carnevali |
| 2006/0000957 A1 | 1/2006 | Carnevali |
| 2007/0108244 A1 | 5/2007 | Chuang |
| 2008/0061195 A1 | 3/2008 | Carnevali |
| 2008/0061197 A1* | 3/2008 | Carnevali ............ F16M 13/022 248/181.1 |
| 2008/0197250 A1 | 8/2008 | Kaneda et al. |
| 2008/0245935 A1 | 10/2008 | Kaneda et al. |
| 2009/0000457 A1 | 1/2009 | Dunlop |
| 2009/0108151 A1 | 4/2009 | Carnevali |
| 2009/0108152 A1 | 4/2009 | Carnevali |
| 2010/0059650 A1 | 3/2010 | Kaneko |
| 2011/0097177 A1 | 4/2011 | Carnevali |
| 2011/0318093 A1 | 12/2011 | Liao |
| 2014/0042294 A1 | 2/2014 | Marzynski |
| 2014/0166826 A1* | 6/2014 | Liao ..................... F16M 11/041 403/327 |
| 2015/0183478 A1 | 7/2015 | Tate |
| 2016/0356415 A1 | 12/2016 | Moore |
| 2018/0001950 A1 | 1/2018 | Allen |
| 2018/0056888 A1 | 3/2018 | Wang |
| 2021/0001780 A1 | 1/2021 | Hancock |
| 2021/0045485 A1 | 2/2021 | Shoulders |
| 2023/0059408 A1 | 2/2023 | Parab |

OTHER PUBLICATIONS

Armour-X, "X-P9K, U-Bolt Bar Mount, One-Lock For Phone," retrieved from the Internet at: https://www.armor-x.com/x-p9k-u-bolt-bar-mount-one-lock-for-phone.html (publicly available at least by Aug. 17, 2021).

Kondor Blue, "Cine Magic Arm Pro," retrieved from the Internet at: https://kondorblue.com/products/cine-magic-arm-pro (publicly available at least by Aug. 17, 2021).

Pgytech, "Magic Arm," retrieved from the Internet at: https://www.pgytech.com/products/magic-arm, (publicly available at least by Aug. 17, 2021).

Ram, "Composite Double Socket Arm" retrieved from the Internet at https://www.rammount.com/part/RAP-B-201U, (publicly available at least by Aug. 17, 2021).

Ram, "Composite Double Socket Short Arm," retrieved from the Internet at: https://www.rammount.com/part/RAP-B-201U-A, (publicly available at least by Aug. 17, 2021).

Rok Form, "Universal Ball Adapter Phone Mount," retrieved from the Internet at: www.rokform.com/products/universal-ball-adapter-phone-mount? (publicly available at Teast by Aug. 17, 2021).

Scosche, "MagicMount™ Stage Pro Large," retrieved from the Internet at: www.scosche.com/stage-magicmount-pro-large-for-mic-stand (publicly available at least by Aug. 17, 2021).

RAM Mounts, "RAM Mounts On-Road Catalog," [retreived from internet on Aug. 30, 2022] < URL: https://rammount.com/pages/catalogs > published Feb. 2021.

Search Report & Written Opinion issued in Int'l Appl. No. PCT/AU2022/050873 (dated 2022).

* cited by examiner

MOUNT FOR A HANDHELD ELECTRONIC DEVICE

BACKGROUND

The present disclosure relates to a mount for a handheld electronic device.

SUMMARY

A mount for mounting a case of a handheld electronic device to a vehicle in accordance with the present disclosure includes an arm comprising a pair of arm members; a first coupling member engaged with the arm for adjustably coupling the arm to the case; a second coupling member engaged with the arm for adjustably coupling the arm to the vehicle; a fastener for adjustably securing the two arms together, the fastener is rotatable between a first position in which the arm members are rigidly secured together and the first and second coupling members are rigidly secured to the arm and a second position enabling adjustment of the first coupling member and the second coupling member relative to the arm; a sleeve secured to at least one of the arm members defining a fastener hole receiving the fastener, the sleeve including a flange, a spring disposed about the sleeve proximal of the flange and coupled to the arm members, the spring biasing the arm members toward each other when the fastener is rotated to the second position; and a washer disposed about the sleeve proximal of the flange adjacent to an end of the spring, the flange maintaining the washer on the sleeve. Each of the first and second coupling members may have a ball shaped end for permitting adjustment of the coupling members relative to the arm. The arm members may define a first socket for receiving one of the ball shaped ends and a second socket for receiving the other of the ball shaped ends. The first and second sockets are disposed at opposite ends of the arm. The flange and one of the arm members defines a bore within the fastener hole, the spring and the sleeve are disposed within the bore.

The sleeve may be generally cylindrical and the fastener hole may be a threaded hole and the fastener may be threaded. The arm may define on one or both sides a slot extending along a lateral side of the arm for receiving a power cord and include a detent for securing the cord within the elongated opening.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures, and like reference characters designate the same or similar parts throughout the figures, of which.

Figure 1:
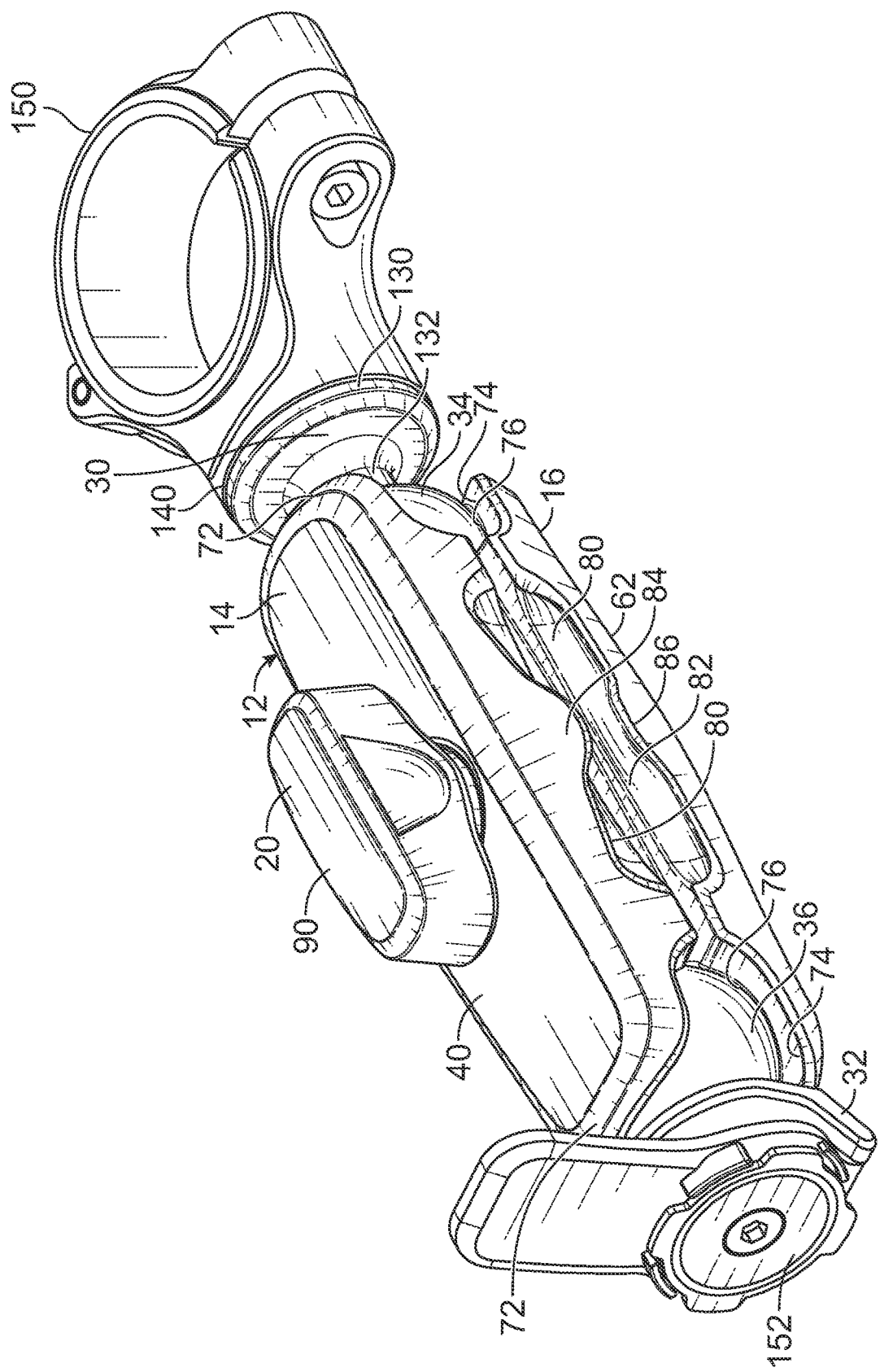
FIG. 1 is a perspective view of a mount for mounting a handheld device to a handlebar of a vehicle in an accordance with an illustrated embodiment of the present disclosure.
Figure 2:
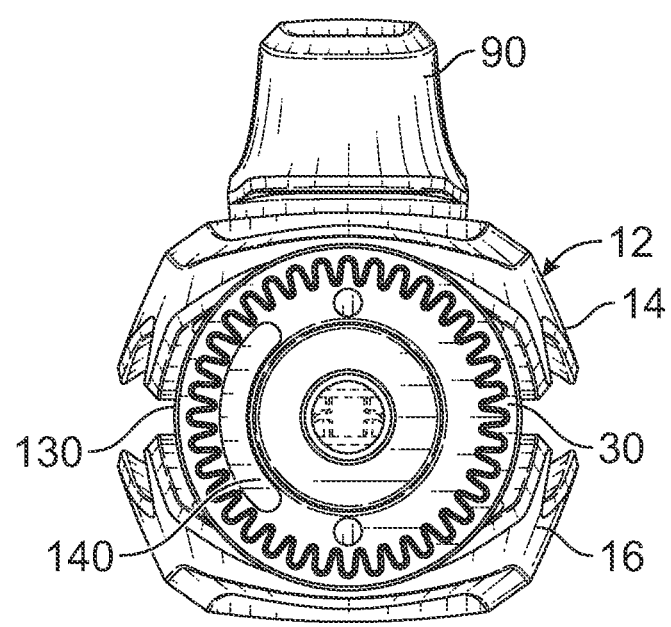
FIG. 2 is a plan view of one end of the mount of FIG. 1.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

Illustrated embodiments of a mount for mounting a case of a smartphone or other handheld device to a bicycle, motorcycle or other vehicle in accordance with the present disclosure are shown in FIGS. 1-7. The illustrated mount is in the form of an arm 12 comprising a pair of arm members 14 and 16, a fastener 20 for adjustably securing the arm members together, a coil spring 22, a washer 24 and a pair of coupling members 30 and 32 having ball shaped ends 34 and 36. The arm member 14 comprises a top or first surface 40 and a bottom or second surface 42. The top and bottom surfaces 40 and 42 of the arm member 14 define a hole 50. The bottom surface 42 includes a pair of contact surfaces 52. The bottom surface 42 also defines a pair of slots 54 extending in opposite directions along a longitudinal axis of the arm member 14 from the hole 50.

The arm member 16 comprises a top or first surface 60 and a bottom or second surface 62. The bottom surface 62 includes a pair of contact surfaces 64. A sleeve 66 extends from the bottom surface 62 of the arm member 16 through the hole 50 of the arm member 14. The bottom surface 62 includes a pair of ribs 68 extending upwardly in opposite directions away from the sleeve 66 along a longitudinal axis of the arm member 16. The bottom surface 62 may include a circular base surrounding the sleeve 66, with the ribs 68 extending from the circular base upwardly in opposite directions away from the sleeve 66 along a longitudinal axis of the arm member 16.

When the arm members 14 and 16 are engaged, the bottom surface 42 of the arm member 14 faces the top surface 60 of the arm member 16, the contact surfaces 52 and 64 engage each other, and the ribs 68 of arm member 16 are received within the slots 54 of arm member 14. The arm members 14 and 16 each include on each end a pair of curved surfaces 72 and 74 that define a socket 76 on each end for receiving a respective ball shaped end 34 and 36. Each of the arm members 14 and 16 may also define on opposed sides a channel 80 that together form a slot 82 for receiving a power cord or the like. Each arm member 14 and 16 also includes a detent 84 and 86 for releasably securing the power cord or the like within the slot 82. The sleeve 66 is internally-threaded and 66 defines a threaded fastener hole 88. The arm 12 and the arm members 14 and 16 may be constructed of plastic or any other suitable material. The arm 12 and the arm members 14 and 16 may have any other suitable construction in accordance with other embodiments of the present disclosure.

Figure 3:
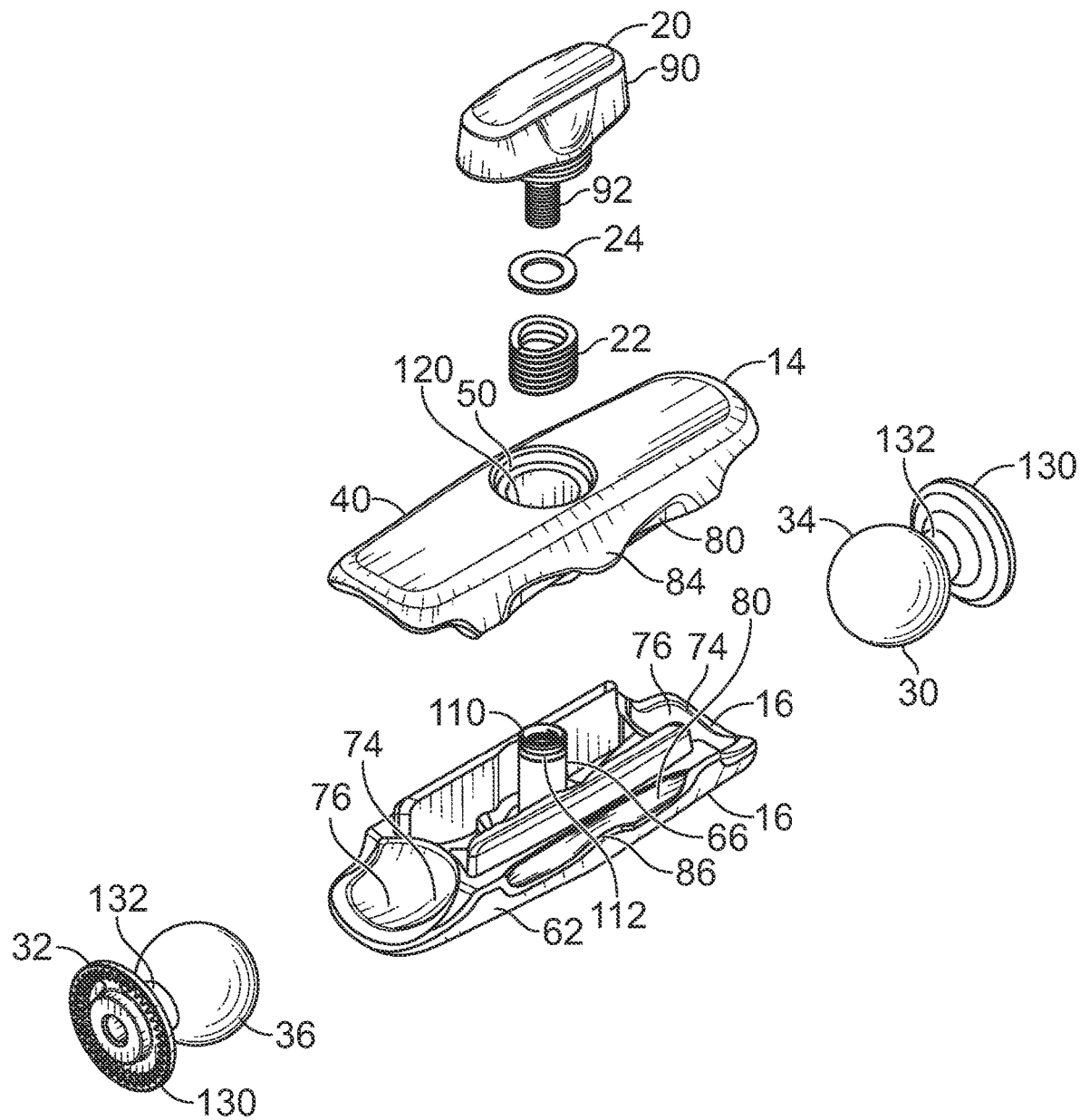
FIG. 3 is an exploded view of the mount of FIG. 1.
Figure 4:
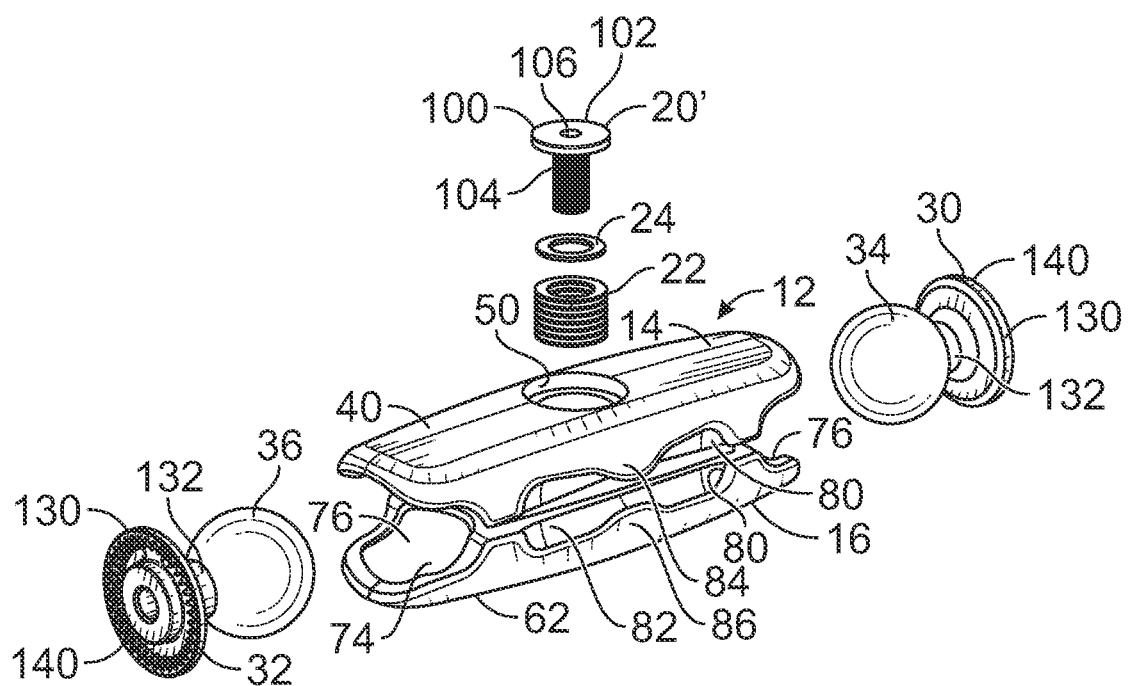
FIG. 4 is a partially exploded view of the mount of FIG. 1 in accordance with an embodiment utilizing another embodiment of the fastener in accordance with another illustrated embodiment of the present disclosure.
Figure 5:
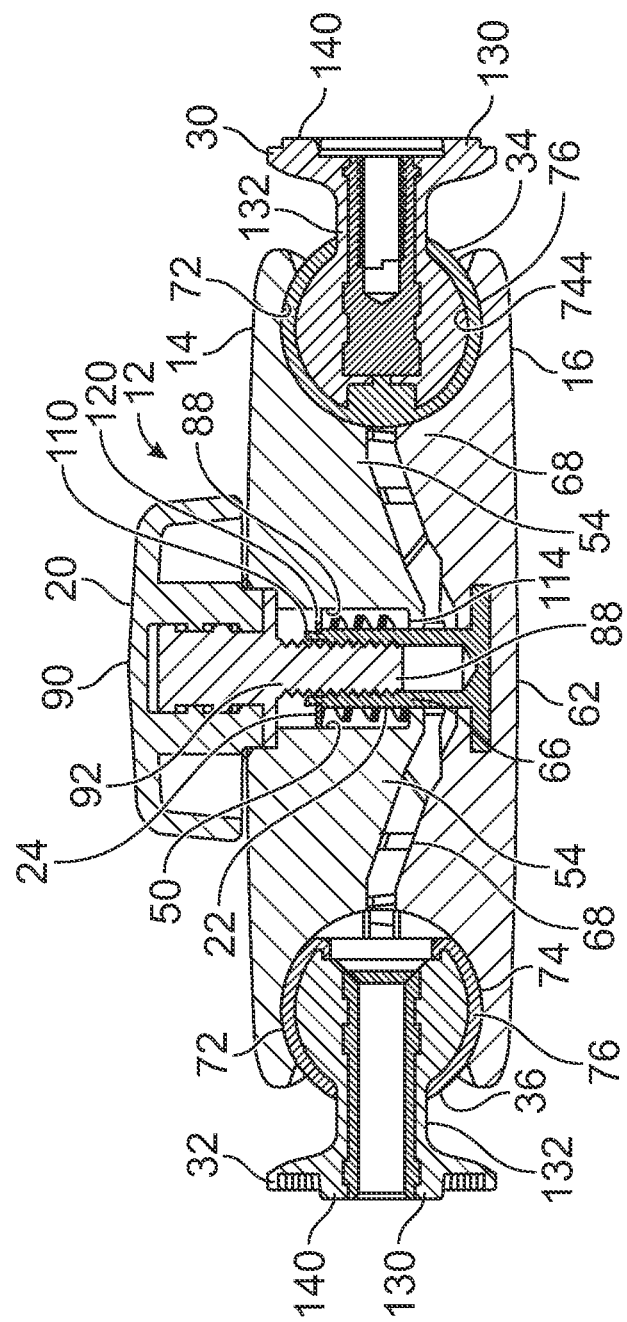
FIG. 5 is a sectional view taken along the central longitudinal axis of the mount of FIG. 1.
Figure 6:
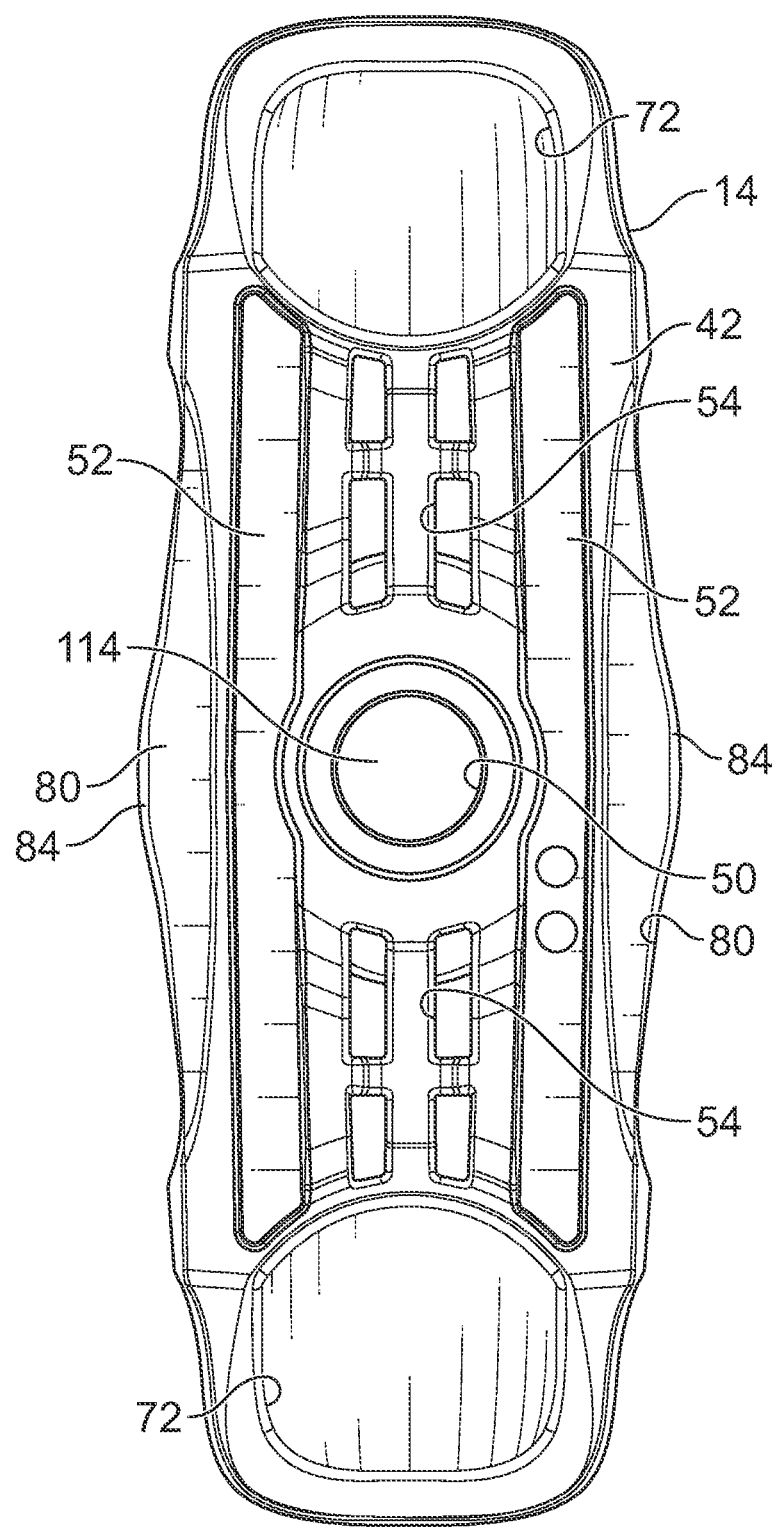
FIG. 6 is a plan view of a bottom surface one of the arm members of the mount of FIG. 1.
Figure 7:
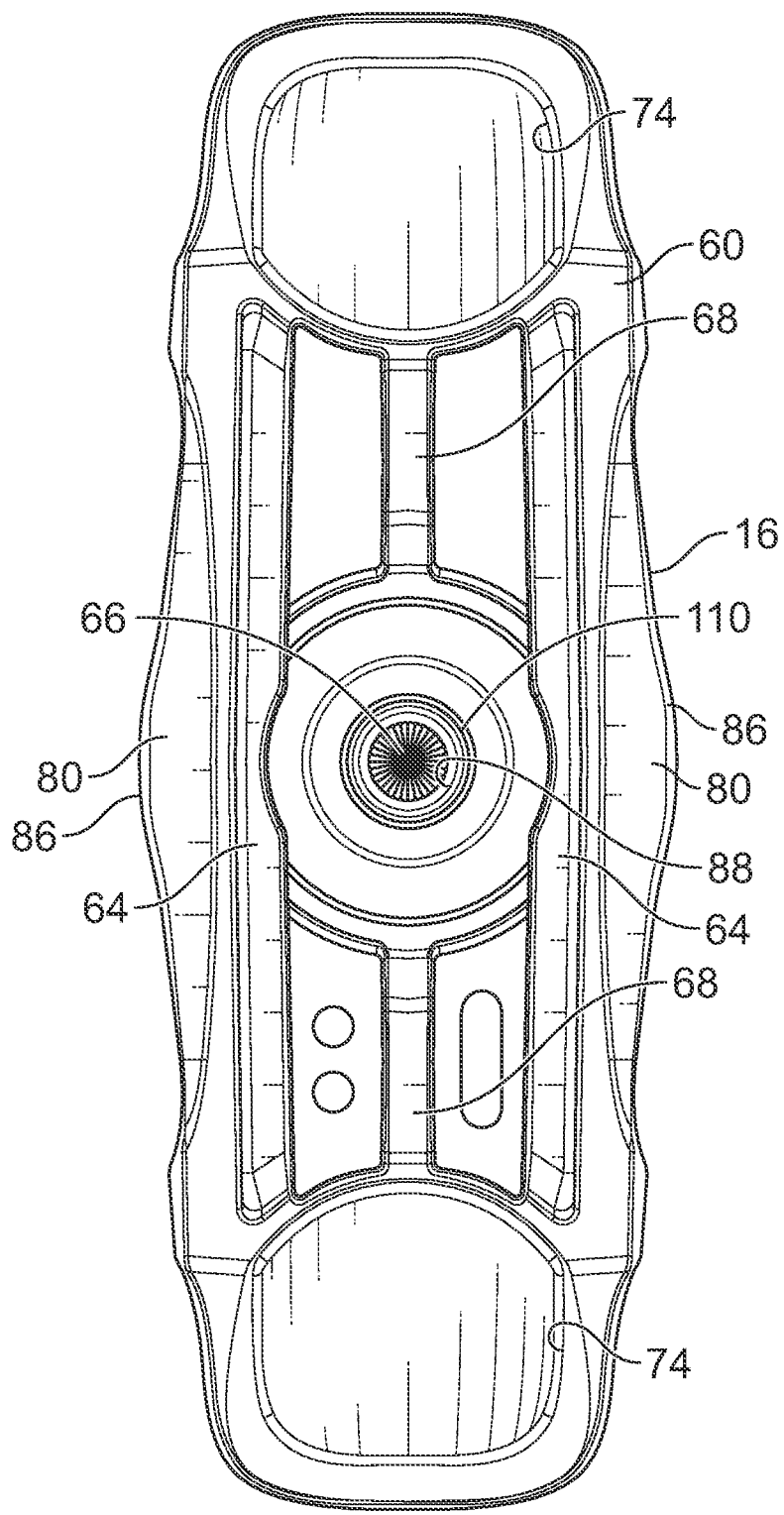
FIG. 7 is a plan view of a bottom surface of the other arm member of the mount of FIG. 1.

The fastener 20 may have any suitable configuration. In the embodiment of FIG. 3, the fastener 20 comprises a knob 90 and a threaded stem 92 extending from the knob into the through hole 50 and the threaded fastener hole 88 to threadingly engage the sleeve 66. In the embodiment of FIG. 4, the fastener 20 comprises a bolt 100 including a flat head 102 and the threaded stem 104. The flat head 102 defines a hole 106 for receiving a screwdriver such as, for example, an allen bolt screwdriver. The fastener 20 may be of any type in accordance with other embodiments of the present disclosure.

The sleeve 66 terminates in an outwardly extending flange 110 and includes a ledge 112 proximal of the flange. The flange 110 and a base 114 of the bottom surface 42 defines a bore 120 within hole 50. The spring 22 and sleeve 66 are disposed within hole 50 and within bore 120. The spring 22 is disposed about the sleeve 66. The washer 24 is disposed on the ledge 112 adjacent an end of the spring 22. The flange 110 prevents the washer 24 from being disengaged from the sleeve 66. The washer 24 limits movement of the spring 22 along the sleeve 66. The spring 22 extends within the bore 120 from the base 114 to the washer 24. The illustrated sleeve 66 has a base secured to the arm member 16. The sleeve 66 may have any other construction in accordance with other embodiments. One end of the spring engage the base 114 and the other engages the washer 24.

The fastener 20 is rotatable between a first position wherein the arm members 14 and 16 are secured together and the coupling members 30 and 32 are secured in place and a second position wherein the coupling members can be pivotably adjusted. When the fastener 20 is rotated to the second position, the arm members 14 and 16 separate slightly from each other. The slight separation of the arm members 14 and 16 caused squeezing of the spring 22 in the axial direction of the spring which, in turn, causes the spring to bias the arm members toward each other and to limit separation of the arm members. In the second position, the arm members 14 and 16 remain engaged but are slightly looser so coupling members 30 and 32 can be pivotably adjusted while the arm members 14 and 16 remain engaged. In the second position, the spring 22 applies pre-load, which, combined with the friction to the ball shaped ends 34 and 36 and sockets 76, causes arm 12 to remain secured to the ball shaped ends. In this position, the arm 12 cannot freely move on the ball shaped ends without application of sufficient manual force intended to adjust the positioning of the coupling members 30 and 32 relative to the arm 12. This feature enables the user to position the coupling members 30 and 32 relative to the arm 12 upon application of sufficient manual force and to remain in that position when the fastener 20 is in the second position. This feature also maintains the coupling members 30 and 32 in place relative to the arm 12 before and after any position adjustment is made. This feature also permits the user to change fasteners 20 or fastener types while the arm 12 remains in the desired position.

After the coupling members 30 and 32 are adjusted to the desired position, fastener 20 is rotated to the first position to rigidly secure the coupling members to the arm 12 and to rigidly secure together the arm members 14 and 16. The washer 24 may be any other type of stop that limits the movement of the spring 22. The flange 110 may be in the form of an outwardly flared end of the sleeve 66 or may be of any other construction or configuration in accordance with other embodiments of the present disclosure.

Each coupling member 30 and 32 includes a base 130 and a stem 132 interconnecting a respective ball shaped end 34, 36 and the base. A distal side of each coupling member 30 and 32 includes a face 140. One of the faces 140 engages a vehicle and the other face 140 engages a case of a handheld device. The faces 140 can include circumferentially spaced teeth or circumferentially spaced slots faces 140 can be male and/or female mounts. The mountings can occur in any suitable manner. For example, one of the faces 140 can be mounted to a case of a handheld device by direct mounting or by securing to an intermediate mount that secures to the case of a handheld device. The case of the handheld device may be the handheld device itself or a separate case securable to the handheld device. The other face 140 can be mounted to the vehicle by, for example, mounting to a base securable to a vehicle. In the embodiment of FIG. 1, the arm 12 mounts the case of the handheld device to the vehicle. The arm 12 is mounted on one end to a base 150 for securing to a handlebar of the vehicle and on the other end to a head 152 that engages the handheld device. The handheld device can be any type of electronic handheld device and have any suitable structure for mounting to either of the coupling members 32 and 34 or to an intermediate mount that is mounted to either of the coupling members.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation to encompass all such modifications and equivalent structures and functions.

The invention claimed is:

1. A mount for mounting a case of a handheld electronic device to a vehicle, the mount comprising:
   an arm comprising a pair of arm members;
   a first coupling member engaged with the arm for adjustably coupling the arm to the case;
   a second coupling member engaged with the arm for adjustably coupling the arm to the vehicle;
   a fastener for adjustably securing the two arm members together, the fastener is rotatable between a first position in which the arm members are rigidly secured together and the first and second coupling members are rigidly secured to the arm and a second position enabling adjustment of the first coupling member and the second coupling member relative to the arm;
   a sleeve secured to at least one of the arm members defining a fastener hole receiving the fastener, the sleeve including a flange;
   a spring disposed about the sleeve proximal of the flange and coupled to the arm members, the spring biasing the arm members toward each other when the fastener is rotated to the second position; and
   a washer disposed about the sleeve proximal of the flange adjacent to an end of the spring, the flange maintaining the washer on the sleeve.

2. The mount of claim 1 wherein at least one of the first and second coupling members has a ball shaped end for permitting adjustment of said at least one of the first and second coupling members relative to the arm.

3. The mount of claim 2 wherein the arm members define a socket for receiving the ball shaped end.

4. The mount of claim 3 wherein the spring creates a friction force between the arm members and the ball shaped end when the fastener is rotated to the second position sufficient to maintain the positioning of the ball shaped end relative to the arm members without application of sufficient manual force.

5. The mount of claim 1 wherein each of the first and second coupling members has a ball shaped end for permitting adjustment of the first and second coupling members relative to the arm.

6. The mount of claim 5 wherein each arm member defines a first socket for receiving one of the ball shaped ends and a second socket for receiving the other of the ball shaped ends.

7. The mount of claim 6 wherein the spring creates a friction force between the arm members and the ball shaped ends when the fastener is rotated to the second position sufficient to maintain the positioning of the ball shaped ends relative the arm members without application of sufficient manual force.

8. The mount of claim 7 wherein the first and second sockets are disposed at opposite ends of the arm.

9. The mount of claim 1 wherein the sleeve is generally cylindrical and the fastener hole is threaded and the fastener is threaded.

10. The mount of claim 1 wherein one of the arm members defines a hole receiving the fastener and includes a base defining the hole, the washer, the spring and the sleeve disposed within the hole, the spring engaging the washer on one end of the spring and the base on another end of the spring.

11. The mount of claim 10 wherein the washer and base define a bore, the spring and sleeve disposed within the bore.

12. The mount of claim 1 wherein the arm defines a slot extending along a lateral side of the arm for receiving a cord and includes a detent for securing the cord within the slot.

13. The mount of claim 12 wherein the arm has a length and the slot extends along the length.

14. The mount of claim 1 wherein the arm has two lateral sides, each lateral side defining a slot for receiving a cord and a detent for securing the cord within the slot.

15. The mount of claim 1 wherein the flange and one of the arm members defines a bore, the spring and the washer disposed within the bore.

16. The mount of claim 1 wherein the fastener comprises a knob and a threaded stem.

17. The mount of claim 1 wherein the fastener comprises a flat head defining a hole for receiving a screw driver and a threaded stem.

18. A mount for mounting a case of a handheld electronic device to a vehicle, the mount comprising:
    an arm comprising a pair of arm members defining a pair of sockets;
    a stop;
    a first coupling member for coupling the arm to the case and a second coupling member for coupling the arm to the vehicle, each of the first coupling member and second coupling member having a ball shaped end received by a respective socket for permitting adjustment of the arm relative to the case and the vehicle;
    a fastener engaged with the two arm members for adjustably securing the two arm members together, the fastener is rotatable between a first position in which the arm members are rigidly secured together and a second position enabling adjustment of the first coupling member and the second coupling member relative to the arm;
    a spring coupled to the arm members for biasing the arm members toward each other to limit separation of the arm members when the fastener is in the second position; and
    a sleeve secured to at least one of the arm members defining a fastener hole receiving the fastener, the sleeve having a flange defining a bore, within the fastener hole the stop and the spring disposed within the bore.

19. The mount of claim 18 wherein at least one of the arm members defines the fastener hole and includes a base, the base and the stop defining the bore within the fastener hole, the spring and the sleeve disposed within the bore, the spring engaging the stop on one end of the spring and the base on the other end of the spring.

20. The mount of claim 18 wherein the stop comprises a washer disposed about the sleeve.

21. The mount of claim 18 wherein the sleeve is generally cylindrical and the fastener hole is threaded and the fastener is threaded.

22. The mount of claim 18 wherein the spring creates a friction force between the arm members and the ball shaped ends when the fastener is rotated to the second position sufficient to maintain the positioning of the ball shaped ends relative to the arm members without application of sufficient manual force.

23. The mount of claim 18 wherein the arm defines a slot extending along a lateral side of the arm for receiving a cord and a detent for securing the cord within the slot.

24. The mount of claim 18 wherein the arm has two lateral sides, each lateral side defining a slot for receiving a cord and a detent for securing the respective cord within the slot.

25. The mount of claim 18 wherein the sockets are disposed at opposite ends of the arm.

* * * * *